(12) United States Patent
Harnefors et al.

(10) Patent No.: US 11,646,653 B2
(45) Date of Patent: May 9, 2023

(54) SWITCHING CIRCUIT WITH SNUBBER COMPONENTS

(71) Applicant: Hitachi Energy Switzerland AG, Baden (CH)

(72) Inventors: Lennart Harnefors, Västerås (SE); Daniel Johannesson, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/768,128

(22) PCT Filed: Oct. 15, 2019

(86) PCT No.: PCT/EP2019/077848
§ 371 (c)(1),
(2) Date: Apr. 11, 2022

(87) PCT Pub. No.: WO2021/073721
PCT Pub. Date: Apr. 22, 2021

(65) Prior Publication Data
US 2022/0368246 A1 Nov. 17, 2022

(51) Int. Cl.
*H02M 1/34* (2007.01)
*H02M 7/483* (2007.01)

(52) U.S. Cl.
CPC ............. *H02M 1/34* (2013.01); *H02M 7/483* (2013.01); *H02M 7/4835* (2021.05)

(58) Field of Classification Search
CPC .......... H02M 1/32; H02M 1/34; H02M 7/483; H02M 7/4835
See application file for complete search history.

(56) References Cited

U.S. PATENT DOCUMENTS

| 5,982,646 A | 11/1999 | Lyons et al. |
| 6,166,933 A * | 12/2000 | Bowers ................... H02M 1/34 363/56.05 |
| 2003/0026118 A1 | 2/2003 | Ikimi et al. |
| 2008/0043500 A1 | 2/2008 | Asano et al. |
| 2016/0218615 A1 | 7/2016 | Senturk et al. |

(Continued)

FOREIGN PATENT DOCUMENTS

| CN | 202524283 U | 11/2012 |
| DE | 202013104510 U1 | 11/2013 |

(Continued)

*Primary Examiner* — Adolf D Berhane
(74) *Attorney, Agent, or Firm* — Slater Matsil, LLP

(57) ABSTRACT

A switching circuit for a voltage source converter includes a string of series-connected switches and a string of capacitors. A first conductor interconnects a first end of the string of series-connected switches with a first end of the string of capacitors at a first switch and a second conductor interconnects a second end of the string of series-connected switches with a second end of the string of capacitors at a second switch. A first string of components is connected between the first end of the string of series-connected switches and the first end of the string of capacitors and includes a snubber component for the first switch. A second string of components is connected between the second end of the string of series-connected switches and the second end of the string of capacitors and includes a snubber component for the second switch.

20 Claims, 4 Drawing Sheets

(56) References Cited

U.S. PATENT DOCUMENTS

| | | |
|---|---|---|
| 2017/0294859 A1 | 10/2017 | Marvin et al. |
| 2018/0048255 A1 | 2/2018 | Marvin et al. |
| 2019/0013743 A1 | 1/2019 | Zhang et al. |
| 2019/0067167 A1 | 2/2019 | Hong et al. |

FOREIGN PATENT DOCUMENTS

| | | |
|---|---|---|
| EP | 1768244 A1 | 3/2007 |
| EP | 3073812 A2 | 9/2016 |
| JP | 2003052178 A | 2/2003 |
| JP | 2004080880 A | 3/2004 |
| JP | 2005012950 A | 1/2005 |
| JP | 2019086295 A | 6/2019 |
| WO | 2006003936 A1 | 1/2006 |
| WO | 2015162675 A1 | 10/2015 |
| WO | 2018006970 A1 | 1/2018 |

* cited by examiner

SWITCHING CIRCUIT WITH SNUBBER COMPONENTS

CROSS-REFERENCE TO RELATED APPLICATIONS

This application is a national stage application of International Application No. PCT/EP2019/077848, filed on Oct. 15, 2019, which application is hereby incorporated herein by reference.

FIELD OF INVENTION

The present invention generally relates to a switching circuit for a voltage source converter.

BACKGROUND

Switching circuits used for voltage source converters, such as half-bridge switching circuits, typically comprise a string of switches in parallel with a string of capacitors. These switches may experience ringing during their operation. This ringing is typically damped using snubber components connected in parallel with the switches, either in parallel with each snubber or in parallel with the whole string.

One such snubber realization is disclosed in US 2018/0048255.

However, the switches may have to handle high voltage levels. Thereby also the above-mentioned snubber components have to be designed to handle these high voltage levels. Consequently, the snubber components have to be large and bulky.

It is therefore of interest to provide snubber components for a switching circuit, which snubber components do not have to withstand the high voltage levels of the switches and may therefore be made with a lower voltage ratings.

SUMMARY OF THE INVENTION

One object of the present invention is to provide a switching circuit, where the voltage rating of the snubber components may be lowered.

This object is according to a first aspect solved through a switching circuit as or for a voltage source converter, the switching circuit comprising:
  a string of series-connected switches comprising a first and a second switch,
  a string of capacitors comprising at least one capacitor,
  a first conductor interconnecting, at the first switch, a first end of the string of series-connected switches with a first end of the string of capacitors,
  a second conductor interconnecting, at the second switch, a second end of the string of series-connected switches with a second end of the string of capacitors,
  a first string of components connected between the first end of the string of series-connected switches and the first end of the string of capacitors, and
  a second string of components connected between the second end of the string of series-connected switches and the second end of the string of capacitors,
wherein the first string of components comprises at least one snubber component for the first switch and the second string of components comprises at least one snubber component for the second switch In this way the voltage rating of the snubber components may be lowered.

According to a first variation, the first string of components comprises a first snubber resistor and a first snubber capacitor for the first switch and the second string of components comprises a second snubber resistor and a second snubber capacitor for the second switch.

In order to provide an efficient damping each snubber capacitor may have a value set in dependence of a stray capacitance between terminals of the corresponding switch used for connecting the switch in the string of switching elements. The snubber capacitor may more particularly have a value set as a function of the stray capacitance and a damping factor. The function may additionally comprise a relationship between the stray capacitance and a polynomial of the damping factor, which polynomial may be a second order polynomial.

The damping factor may in turn be a damping factor obtained via an expression of the impedance of the switching circuit, which impedance may be the impedance of the switching circuit as seen from the string of capacitors. The damping factor may more particularly be obtained from a polynomial of the characteristic for the dynamics of the switching circuit, which may be a polynomial of the impedance of the switching circuit. The impedance may be the impedance in a transformed plane, such as in a Laplace plane.

In order to improve the damping, each snubber resistor may in turn have a value set as a function of the damping factor, the stray capacitance and a stray inductance of a loop formed between the string of switching elements and the string of capacitors using the first and second conductor. In this way the stray inductance forms a loop stray inductance. The resistor value may additionally be set as a combination of a first expression based on the damping factor and a second expression based on the loop stray inductance divided by the stray capacitance, where the first expression may be the inverse of the second order polynomial of the damping factor and the second expression may be based on the square root of the stray inductance divided by the stray capacitance and a further polynomial of the damping factor, which further polynomial may be a third order polynomial.

The damping factor may be set as a fixed value and selected from the range of 0.25 and 0.45 and with advantage is set as 0.35. This is advantageous of the stray inductance of the strings of components is unknown.

The damping factor may be set based on a quotient between a stray inductance of the first and second string of components and the loop stray inductance. In order to further improve the damping, the damping factor may be a damping factor that is maximized at the quotient.

Alternatively, the damping factor may be a damping factor corresponding to an absolute damping that is maximized at the quotient, where the absolute damping factor may be obtained based on at least one pole in a dominant pole pair of a polynomial of the impedance of the switching circuit, which polynomial may be the characteristic polynomial that has been adjusted with the stray inductance of the strings of snubber components.

The switching circuit may be a two-level converter. Alternatively, it may be a cell for a modular multilevel converter. Thereby a second aspect of the invention may be directed towards a voltage source converter being or comprising a switching circuit according to the first aspect.

BRIEF DESCRIPTION OF THE DRAWINGS

The present invention will in the following be described with reference being made to the accompanying drawings, where FIG. 1 schematically shows a phase leg of a modular multilevel converter comprising cells as half-bridge switching circuits, FIG. 2 schematically shows a two-level converter realized as a switching circuit, FIG. 3 schematically shows a switching circuit comprising a first and second string of snubber components connected in parallel with a first and second conductor interconnecting a string of switches with a string of capacitors, FIG. 4 schematically shows a circuit board comprising a switching circuit, FIG. 5a schematically shows the relationship of a damping factor and a quotient between a stray inductance of the first and second strings of snubber components and a stray inductance of the conductors as well as a fixed damping factor.

DETAILED DESCRIPTION OF THE INVENTION

In the following, a detailed description of preferred embodiments of a switching circuit will be given.

Figure 1:
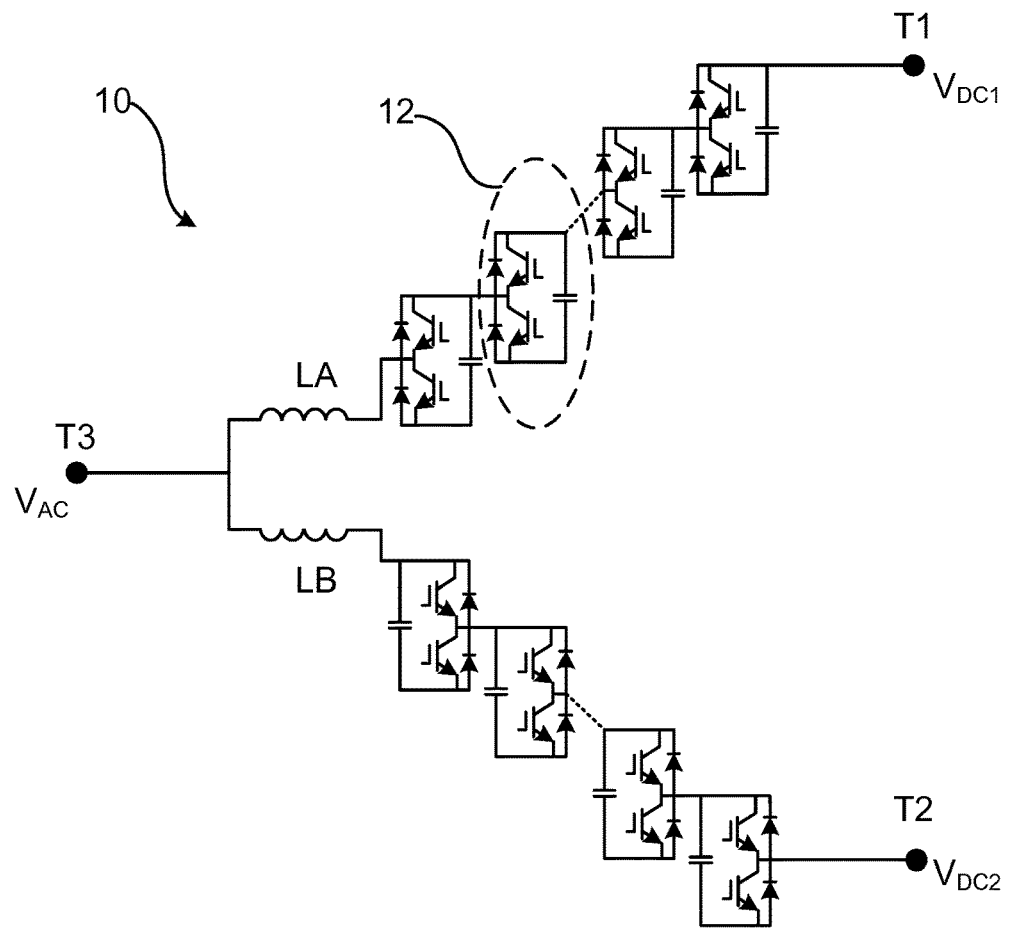

FIG. 1 shows a first way to realize a switching circuit. FIG. 1 shows one phase leg of a modular multilevel converter 10 connected between a first and a second direct current (DC) terminal T1 and T2, where the DC terminals T1 and T2 have a first and a second DC voltage $V_{DC1}$ and $V_{DC2}$. The midpoint of the phase leg provides a third alternating current (AC) terminal T3 with an AC voltage VAC. The phase leg comprises an upper phase arm connected between the first DC terminal T1 and the third AC terminal T3 and a lower phase arm connected between the second DC terminal T2 and the third AC terminal T3, where the upper phase arm is connected to the third terminal T3 with an upper phase inductor LA and the lower phase arm is connected to the third terminal T3 via a lower phase inductor LB. The phase arms of the phase leg comprise cells 12, which in this example are half-bridge cells. A cell comprises a string of switches comprising at least two switches in parallel with a string of capacitors comprising at least one capacitor. In the present example the string of switches comprises a first upper switch and a second lower switch and the string of capacitors comprises a single capacitor. The cell is an example of a switching circuit. A switch is as an example realized as an Insulated-gate bipolar transistor (IGBT) with anti-parallel diode. It should here be realized that there may be three such phase legs in the converter 10, one for each phase of an AC voltage.

Figure 2:
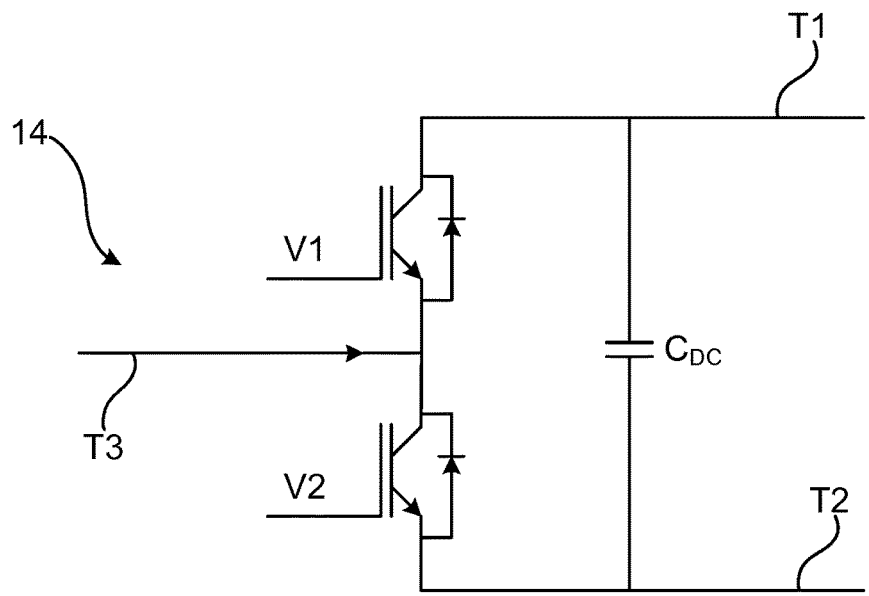

FIG. 2 shows another type of converter, which is a two-level voltage source converter 14. In this case a string of capacitors is a string of DC link capacitors CDC connected between the DC terminals T1 and T2 of the converter. As an example, the string of capacitors does also in this case only comprise one capacitor CDC in parallel with a string of switches, where each switch may be considered to be a converter valve. There is thus a first upper valve V1 and a second lower valve V2, where each valve may be based on an IGBT with anti-parallel diode. Each valve may furthermore be formed through several such component combinations connected in series. It can thereby be seen that there is a string of capacitors comprising at least one capacitor and string of series-connected switches comprising at least two switches. The midpoint between the valves V1 and V2 forms the third terminal T3. In this case the whole converter 14 is a switching circuit. It should here be realized that there may be three such switching circuits, one for each phase of an AC voltage.

A switching circuit may thus be a cell for a voltage source converter or it may be a voltage source converter. It can thereby also be seen that a voltage source converter may be a switching circuit or it may comprise a switching circuit.

Figure 3:
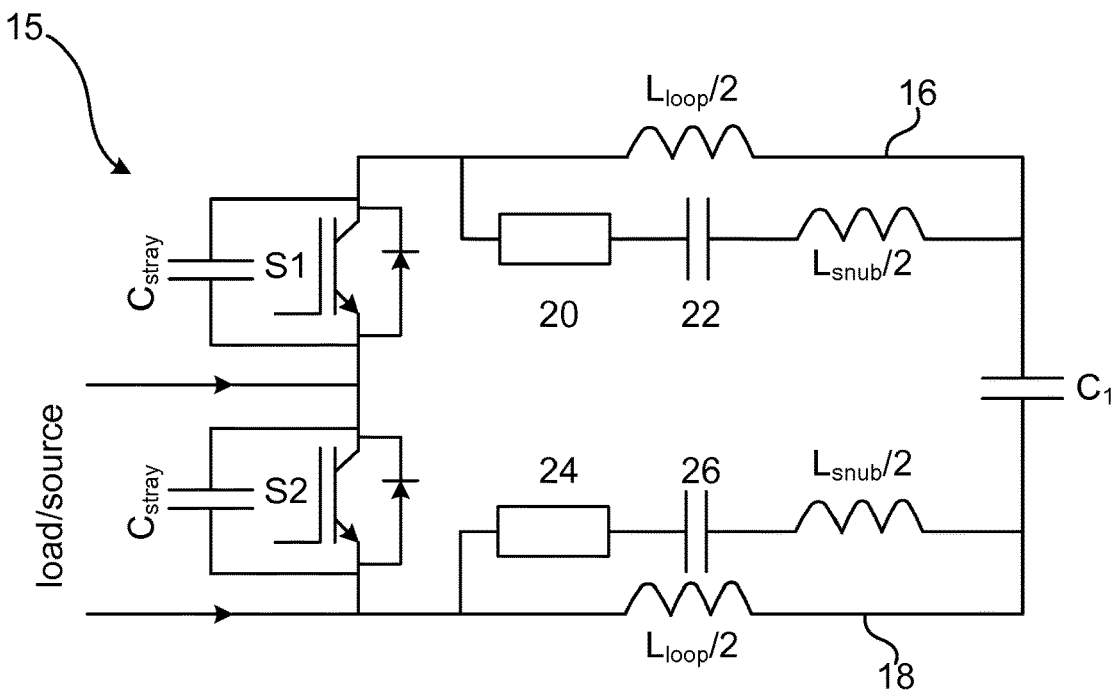

FIG. 3 schematically shows a generalized switching circuit 15. In a switching circuit 15 a first end of the string of switches is, at the first switch S1, connected to a first end of the string of capacitors C1 via a first conductor 16 and a second end of the string of switches is, at the second switch S2, connected to a second end of the string of capacitors via a second conductor 18. There is thereby a first conductor 16 interconnecting, at the first switch S1, a first end of the string of series-connected switches with a first end of the string of capacitors and a second conductor 18 interconnecting, at the second switch S2, a second end of the string of series-connected switches with a second end of the string of capacitors. The switches are connected into the string of switches using connection terminals, which for IGBTs are emitters and collectors and for diodes are anodes and cathodes.

Figure 4:
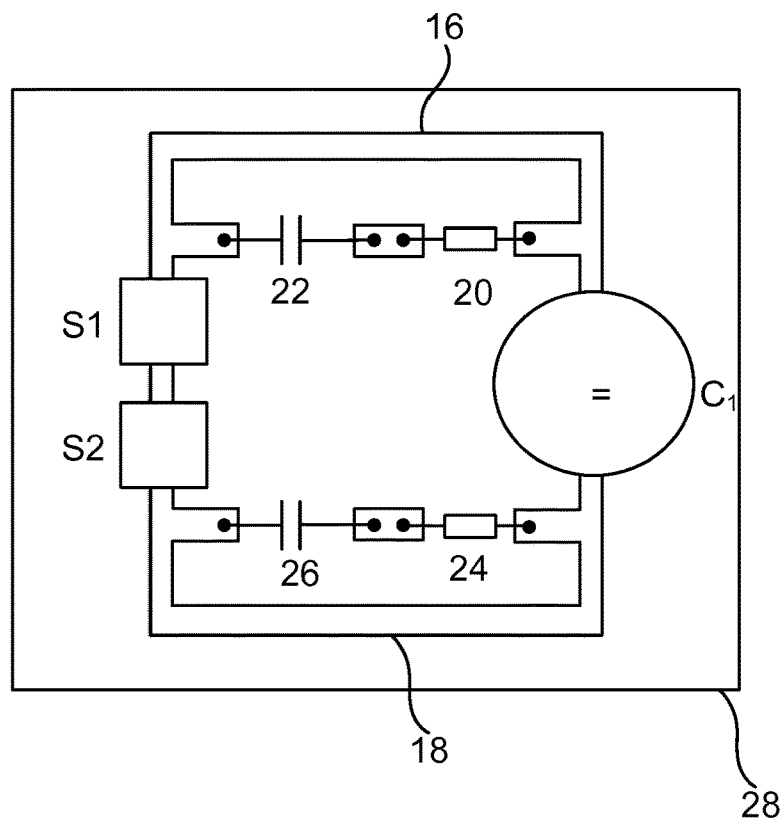

In the case of the switching circuit being a two-level converter, the conductors 16 and 18 may be realized as DC power busbars. In case the switching circuit is a cell, it is possible that the conductors 16 and 18 may be conductor traces on a circuit board, as is indicated in FIG. 4.

Each switch S1 and S2 has a stray capacitance $C_{stray}$. A loop formed by the two conductors 16 and 18, the string of switches and the string of capacitors has a stray inductance $L_{loop}$, where a first half of the stray inductance of the loop $L_{loop}/2$ may be considered as provided by the first conductor 16 and a second half of the stray inductance of the loop $L_{loop}/2$ may be considered as provided by the second conductor 18. In order to dampen the ringing caused by the stray capacitances and stray inductance there is a first string of components connected between the first end of the string of series-connected switches S1 and S2 and the first end of the string of capacitors C1 and a second string of components connected between the second end of the string of series-connected switches S1 and S2 and the second end of the string of capacitors C1, where the first string of components comprises at least one snubber component for the first switch S1 and the second string of components comprises at least one snubber component for the second switch S2. The stray capacitance $C_{stray}$ may be inherent in the transistors and diodes of the switches. This stray capacitance $C_{stray}$ can therefore be seen as the capacitance between the connection terminals used for connecting the switch in the string of switches. The stray inductance $L_{loop}$ is mostly contributed by the conductors 16 and 18 that connect the string of switches with the string of capacitors. However, the transistors and the diodes may make a minor contribution. The stray inductances $L_{loop}/2$ and stray capacitances $C_{stray}$ are thus not any components, but parasitic quantities appearing in the switching circuit 15.

In the example given in FIG. 3, the first string of components comprises a first snubber resistor 20 and a first snubber capacitor 22 for the first switch S1 connected in series with each other, while the second string of components comprises as second snubber resistor 24 and a second snubber capacitor 26 for the second switch S2 connected in series with each other. As can be seen there is also an inductance $L_{snub}/2$ in each of the first and second strings of components. These inductances are stray inductances of the strings. They are thus also not any components, but parasitic quantities appearing in the switching circuit 15.

As was mentioned earlier the stray inductance $L_{loop}$ and the stray capacitance $C_{stray}$, the switching circuit 15 cause ringing to occur across stray of the switches S1 and S2. The first and second string of snubber components are provided in order to dampen the ringing, where the first string of snubber components is connected in parallel with the first conductor 16 and the second string of snubber components is connected in parallel with the second conductor 18. The first and second snubber resistors 20 and 24 may together be seen as providing a snubber resistance $R_{snub}$, and thereby the first resistor 20 may have a resistance of while the second resistor 24 may be seen as having a resistance of $R_{snub}/2$. In a similar manner the two snubber capacitors 22 and 26 may together be seen as providing a snubber capacitance $C_{snub}$. Thereby the first capacitor 22 may have a capacitance of $2*C_{snub}$, while the second capacitor 26 may have a capacitance of $2*C_{snub}$. Furthermore, the two strings of snubber components may together also have a stray inductance or snubber inductance $L_{snub}$. Thereby the first string of snubber components may be seen as having a stray inductance $L_{snub}/2$ and the second string of snubber components may be seen as having a stray inductance of $L_{snub}/2$.

As can be seen in FIG. 4, the strings of snubber components may be placed in conductor structures of a circuit board 28, which conductor structures are connected in parallel with the first and second conductor traces forming the busbars 16 and 18. The snubber inductance or stray inductance of the strings of components may be the stray inductance of these conductor structures of the strings.

The first and second strings of snubber components can give good damping even if not being tightly installed, for instance if $L_{snub}$ is as large as $L_{loop}$.

With this type of placing, the rating of the snubber components can be lowered considerably. The components do not have to be rated for the full DC voltage of the string of capacitors. They only need to withstand the voltage fluctuations occurring across half the loop inductance.

In practice and as can be seen in FIG. 4, the snubber components may be installed using busbars (of lower current rating) that run in parallel with the power busbars 16 and 18. The terminations of these low current rating busbars should be as close to the transistor-switch and dc-link capacitor terminals as possible. They should thus be as close as possible to, i.e. adjacent, the terminal of the first switch S1 in the string of switches that is connected to the first conductor 16, to the terminal of the capacitor C1 in the string of capacitors that is connected to the first conductor 16, to the terminal of the second switch S2 in the string of switches that is connected to the second conductor 18 and to the terminal of the capacitor C1 in the string of capacitors that is connected to the second conductor 18.

In order to provide an efficient damping, it may be of advantage if the values of the snubber components are selected in a special way. One way in which the component value selection can be carried out is described below.

Initially, the snubber stray inductance may be neglected, i.e. $L_{snub}=0$.

Furthermore, since only one of the two transistor switches is turned on at any time, the impedance seen from the string of capacitors comprising the capacitor C1 can approximately be given by $$Z(s) = s L_{loop} + \frac{1}{sC_{stray}} \| \left( R_{snub} + \frac{1}{sC_{snub}} \right) \quad (1)$$

The numerator polynomial of Z(s) equals $$s^3 + \frac{C_{stray} + C_{snub}}{R_{snub} C_{stray} C_{snub}} s^2 + \frac{s}{L_{loop} C_{stray}} + \frac{1}{R_{snub} L_{loop} C_{stray} C_{snub}} \quad (2)$$

Equation (2) is the characteristic polynomial for the circuit dynamics and it can be factorized as $$(s+a)(s^2+2\zeta\omega_1 s+\omega_1^2) \quad (3)$$

Expanding (3) and identifying its coefficients with those of (2) allows $C_{snub}$, $R_{snub}$, and a to be solved as functions of $\omega_1$, $\zeta$, and the commutation-loop parameters $L_{loop}$ and $C_{stray}$. To save space, these functions are omitted. The relative damping is a design parameter free to choose, e.g., as $\zeta=1$ to obtain critical damping. Rather than picking $C_{snub}$ in an unsystematic way, it makes sense to minimize $C_{snub}$, given the desired $\zeta$. The minimum capacitance can be obtained by solving for $\omega_1$ in $\delta C_{snub}/\delta\omega_1$, giving $\omega_1=\omega_0/\sqrt{2\zeta+1}$, where $\omega_0=1/\sqrt{L_{loop}C_{stray}}$. Substitution thereof in the functions for $C_{snub}$ and $R_{snub}$ then yields $$C_{snub} = 4\zeta(\zeta + 1)C_{stray} \quad (4)$$

$$R_{snub} = \frac{1}{4\zeta(\zeta + 1)} \sqrt{\frac{(2\zeta + 1)^3 L_{loop}}{C_{stray}}}$$

As can be seen in equation (4), each snubber capacitor has a value set in dependence of the stray capacitance $C_{stray}$. It can also be seen that the value is set as a function of the stray capacitance $C_{stray}$ and the damping factor $\zeta$. As can also be seen in equation (4), the function may additionally comprise a relationship between the stray capacitance $C_{stray}$ and a polynomial of the damping factor $\zeta$, where the polynomial is a second order polynomial.

As can also be seen in equation (4) each snubber resistor has a value set as a function of the damping factor $\zeta$, the stray capacitance $C_{stray}$ and the loop stray inductance $L_{loop}$. The resistor value is more particularly set as a combination of a first expression based on the damping factor $\zeta$ and a second expression based on the loop stray inductance $L_{loop}$ divided by the stray capacitance $C_{stray}$, where the first expression is the inverse of the second order polynomial of the damping factor $\zeta$ and the second expression is based on the square root of the stray inductance $L_{loop}$ divided by the stray capacitance $C_{stray}$ and a polynomial of the damping factor $\zeta$, which is a third order polynomial of the damping factor.

The snubber stray inductance can now be considered. The inclusion of the snubber stray inductance $L_{snub}$ implies that the third-degree characteristic polynomial (2) is modified to a fourth-degree polynomial. Applying (4), introducing the normalized Laplace variable $\tilde{s}=s/\omega_0$, and letting $L_{snub}=qL_{loop}$ allows this characteristic polynomial to be expressed in the following dimensionless form:

$$q\tilde{s}^4+k_3\tilde{s}^3+k_2\tilde{s}^2+k_1\tilde{s}+k_0 \quad (5)$$

where $$k_0 = \frac{1}{4\zeta(\zeta+1)} \qquad (6)$$
$$k_1 = k_3 = (2\zeta+1)^{3/2} k_0$$
$$k_2 = q + 1 + k_0$$

Equation (5) can be converted into a transfer function with a numerator and a denominator, where the denominator is of interest for the damping.

The denominator is of the general form $(s^2+\sigma_1 s+\omega_1^2)*(s^2+\sigma_2 s+\omega_2^2)$, where each set of parentheses provides a complex conjugated pole pair.

It can be seen in equations (5) and (6) that the damping factor is set based on a quotient q between the snubber inductance, i.e. the stray inductance of the first and second string of components, and the loop stray inductance. A suitable choice of $\zeta$ as a function of q is one which maximizes the damping of the circuit. The damping factor $\zeta$ may thus be a damping factor that is maximized at the quotient q. Clearly, for q=0 this choice is $\zeta=1$, since the circuit then is critically damped. For q>0, the switching transients are mainly governed by the dominant pole pair of (5), i.e., the pole pair that is located closest to the origin. The exponential decay of the ringing is mainly determined by the real part of this pole pair. In the following the expression absolute damping is used, which absolute damping is the absolute value of this real part.

Since (5) is normalized with the undamped angular resonant frequency $\omega_0$, which is not a function of the snubber parameters, maximizing the absolute damping may be a better strategy than maximizing the relative damping; the switching transient then rings out in the shortest possible time. The damping factor that is used may therefore be a damping factor that corresponds to an absolute damping factor that is maximized at the quotient q, where the absolute damping factor is obtained based on at least one pole in a dominant pole pair of a polynomial of the impedance of the switching circuit, which polynomial is the above-described characteristic polynomial that has been adjusted with the snubber stray inductance.

Figure 5A:
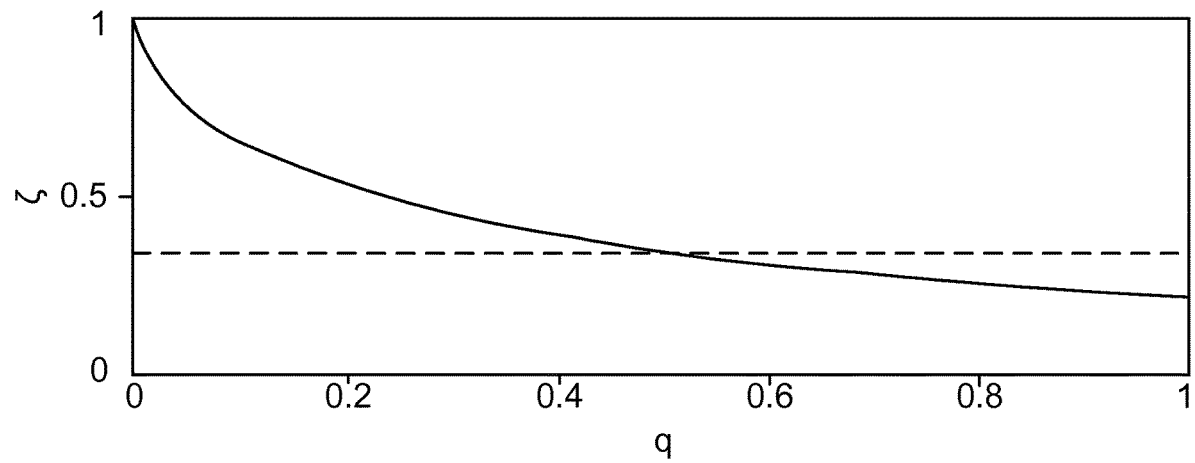
FIG. 5b shows the relationship between the quotient and an absolute damping factor as well as the absolute damping factor associated with the fixed damping factor.
Figure 5B:
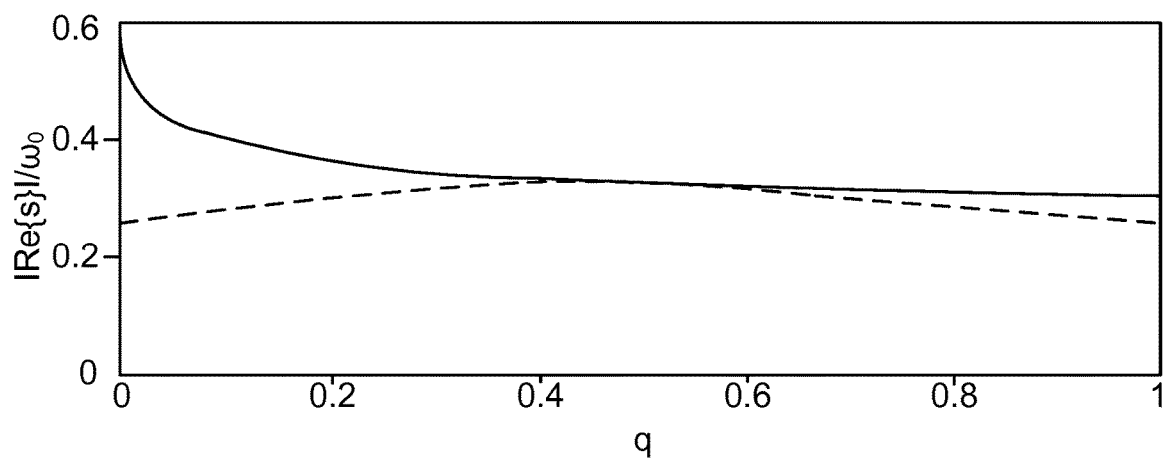
Figure 6A:
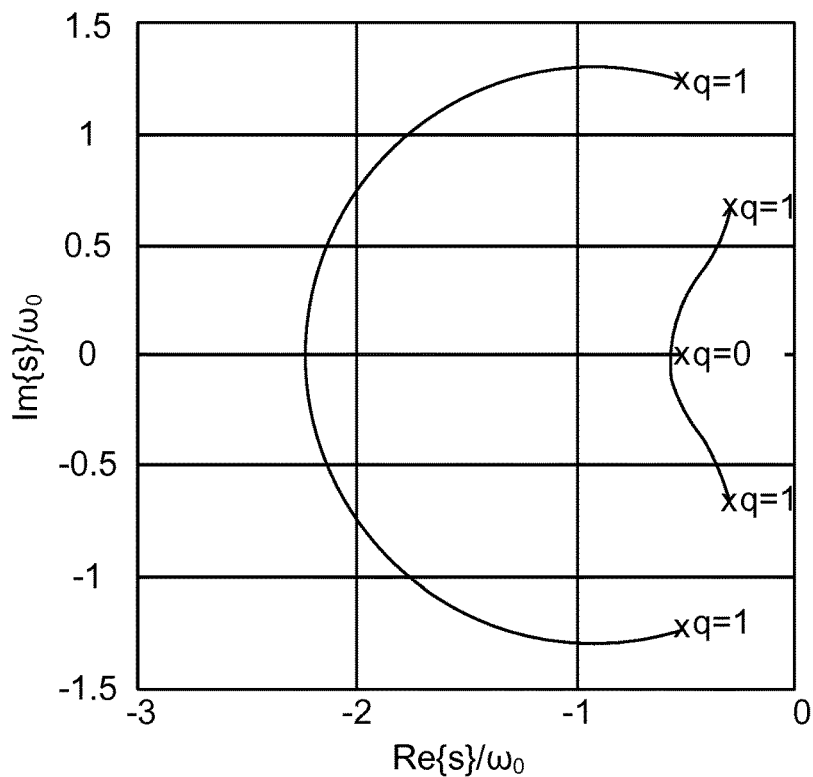
FIG. 6a shows pole loci of a dominant pole pair of the absolute damping factor for different values of the quotient and a damping factor as a function of the quotient.

By invoking a numerical search algorithm that maximizes the absolute damping, the desired selection of as a function of q is found as the solid curve in FIG. 5a. The corresponding absolute damping, i.e. the real value of the pole pair is depicted as the solid curve in FIG. 5b and the pole loci are shown in FIG. 6a. As can be seen, the absolute damping is roughly halved as q increases from 0 to 1 ($|Re\{s\}|/\omega_0$ reduces from 0.58 to 0.30). The relative damping of the dominant pole pair drops from 1 to 0.4, which is yet quite acceptable. (Shown in FIG. 6a are also the loci of the non-dominant pole pair. These are entirely located to the left of the loci for the dominant pole pair, i.e. the damping is higher.) Thus, the snubber stray inductance can be as large as the loop inductance without causing significantly impaired damping.

It is reiterated that damping maximization requires knowledge of the quotient $q=L_{snub}/L_{loop}$, allowing in the snubber design procedure to be chosen according to the solid curve in FIG. 5a.

Figure 6B:
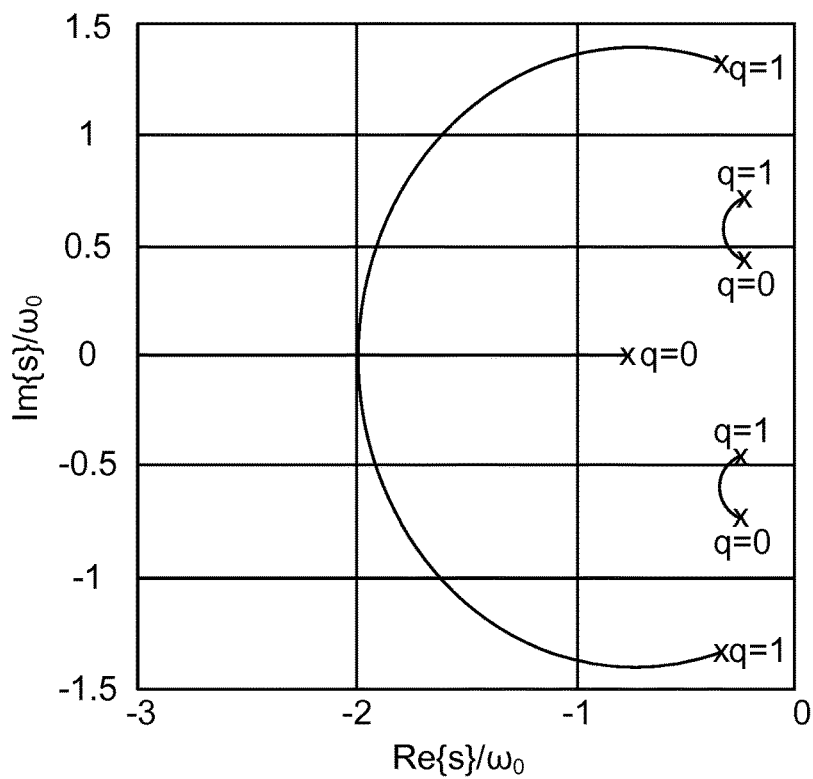
FIG. 6b shows the pole loci of the dominant pole pair of the absolute damping factor, for different values of the quotient when the damping factor is fixed.

It may be hard to determine the stray inductance $L_{snub}$ of the strings of snubber components. Therefore, it is possible that q is inaccurate. To circumvent this, $\zeta$ can be fixed and selected from the range of 0.25 and 0.45 and with advantage be set as 0.35. With a value of 0.35 equal absolute damping is obtained for the extremes q=0 and q=1. This is thus achieved for $\zeta=0.35$. Such a damping is shown as a straight dashed line in FIG. 5a. As shown by the dashed curve in FIG. 5b, higher absolute damping is obtained for all other values of q than the extremes. FIG. 6b shows the pole loci for this fixed value of $\zeta$. For q=0, the obtained relative damping of the dominant pole pair is obviously 0.35, but it increases to 0.49 for q=1, as the pole pair—unlike in FIG. 6a—approaches the real axis as q increases. On the other hand, the real part of the non-dominant pole pair is for q=1 close to the real part of the dominant pole pair. Some effect of the non-dominant pole pair can be expected for q close to 1.

To conclude, it has been shown that setting $\zeta=0.35$ in (4) gives adequate damping for any $L_{snub}$ in the range $[0, L_{loop}]$. For $\zeta=0.35$, the following special case of (4) is obtained:

$$C_{snub} = 1.9 C_{stray} \qquad (7)$$
$$R_{snub} = 1.2 \sqrt{\frac{L_{loop}}{C_{stray}}}$$

As can be seen the snubber component values are set based on the stray capacitances and stray inductances of the switching circuit. The transistor stray capacitance may as an example be obtained from a datasheet of the used components, while the loop stray inductance may as an example be obtained through turn-on and turn-off experiments of the switching circuit without snubber components. From these experiments a frequency can be obtained. It is then possible to extract the loop stray inductance from the frequency with knowledge about the stray capacitance.

The invention can be varied in a multitude of ways. Although the only examples of switches given above are pairs of IGBTs with anti-parallel diodes, it should be realized that other switches are possible. It is for instance possible with junction gate field-effect transistors (JFET) and metal oxide semiconductor field effect transistors (MOSFET) with or without anti-parallel diodes as well as integrated gate-commutated thyristors (IGCT) or gate turn-off thyristors (GTO), with anti-parallel diodes. It should also be realized that if the switching circuit is a cell, it is not limited to a half-bridge cell, but may also be a full-bridge cell. Also switching circuits implementing other types of voltage source converters than two-level converters are envisaged, such as three-level converters, like neutral point clamped converters. It is also possible that only one snubber component is used in a string of snubber components. It is for instance possible with only a snubber capacitor or only a snubber resistor. It shall consequently be realized that the present invention is only to be limited by the following claims.

The invention claimed is:

1. A switching circuit for a voltage source converter, the switching circuit comprising:
   a string of series-connected switches comprising a first and a second switch;
   a string of capacitors;
   a first conductor interconnecting, at the first switch, a first end of the string of series-connected switches with a first end of the string of capacitors;

a second conductor interconnecting, at the second switch, a second end of the string of series-connected switches with a second end of the string of capacitors;

a first string of components connected between the first end of the string of series-connected switches and the first end of the string of capacitors, wherein the first string of components comprises a snubber component for the first switch; and a second string of components connected between the second end of the string of series-connected switches and the second end of the string of capacitors, wherein the second string of components comprises a snubber component for the second switch.

2. The switching circuit according to claim 1, wherein the first string of components comprises a first snubber resistor and a first snubber capacitor for the first switch and the second string of components comprises a second snubber resistor and a second snubber capacitor for the second switch.

3. The switching circuit according to claim 2, wherein the first snubber capacitor has a capacitance value set based on a corresponding stray capacitance between terminals of the first switch and wherein the second snubber capacitor has a capacitance value set based on a corresponding stray capacitance between terminals of the second switch.

4. The switching circuit according to claim 3, wherein each snubber capacitor has a capacitance value set as a function of the corresponding stray capacitance and a damping factor.

5. The switching circuit according to claim 4, wherein, for each snubber capacitor, the function comprises a relationship between a polynomial of the damping factor and the corresponding stray capacitance.

6. The switching circuit according to claim 5, wherein the first snubber resistor has a resistance value set as a function of the damping factor, the corresponding stray capacitance between the terminals of the first switch, and a stray inductance of a loop formed between the string of switches and the string of capacitors using the first conductor;

wherein the second snubber resistor has a resistance value set as a function of the damping factor, the corresponding stray capacitance between the terminals of the second switch, and a stray inductance of a loop formed between the string of switches and the string of capacitors using the second conductor; and wherein the stray inductance of the loop formed between the string of switches and the string of capacitors using the first conductor and the stray inductance of the loop formed between the string of switches and the string of capacitors using the second conductor forming a loop stray inductance.

7. The switching circuit according to claim 6, wherein, for each snubber resistor, the resistance value is set as a combination of a first expression based on the damping factor and a second expression based on the loop stray inductance divided by the corresponding stray capacitance.

8. The switching circuit according to claim 7, wherein, for each snubber resistor, the first expression is the inverse of the polynomial of the damping factor and the second expression is based on the square root of the stray inductance divided by the corresponding stray capacitance and a further polynomial of the damping factor.

9. The switching circuit according to claim 4, wherein the damping factor is set as a fixed value and selected from the range of 0.25 and 0.45.

10. The switching circuit according to claim 4, wherein the damping factor is set based on a quotient between a stray inductance of the first and second string of components and a loop stray inductance, the loop stray inductance based on the stray inductance of the loop formed between the string of switches and the string of capacitors using the first conductor and the stray inductance of the loop formed between the string of switches and the string of capacitors using the second conductor.

11. The switching circuit according to claim 10, wherein the damping factor is the damping factor corresponding to an absolute damping that is maximized at the quotient.

12. The switching circuit according to claim 11, wherein the absolute damping factor is obtained based on at least one pole in a polynomial of an impedance of the switching circuit.

13. The switching circuit according to claim 10, wherein the damping factor is a damping factor that is maximized at the quotient.

14. The switching circuit according to claim 1, wherein the voltage converter is a two-level converter.

15. The switching circuit according to claim 1, where the switching circuit is a cell of modular multilevel converter.

16. The switching circuit according to claim 3, wherein the first snubber resistor has a resistance value set as a function of a damping factor, the corresponding stray capacitance between the terminals of the first switch and a stray inductance of a loop formed between the string of switches and the string of capacitors using the first conductor; and wherein the second snubber resistor has a resistance value set as a function of the damping factor, the corresponding stray capacitance between the terminals of the second switch and a stray inductance of a loop formed between the string of switches and the string of capacitors using the second conductor.

17. A switching circuit for a voltage source converter, the switching circuit comprising:

a string of series-connected switches comprising a first and a second switch;

a string of capacitors;

a first conductor interconnecting, at the first switch, a first end of the string of series-connected switches with a first end of the string of capacitors;

a second conductor interconnecting, at the second switch, a second end of the string of series-connected switches with a second end of the string of capacitors;

a first string of components connected between the first end of the string of series-connected switches and the first end of the string of capacitors, wherein the first string of components comprises a first snubber resistor and a first snubber capacitor for the first switch, wherein the first snubber capacitor has a capacitance value set as a function of a damping factor and a corresponding stray capacitance between terminals of the first switch, the damping factor being set as a fixed value between 0.25 and 0.45 and the function comprising a relationship between a polynomial of the damping factor and the corresponding stray capacitance; and a second string of components connected between the second end of the string of series-connected switches and the second end of the string of capacitors, wherein the second string of components comprises a second snubber resistor and a second snubber capacitor for the second switch, wherein the second snubber capacitor has a capacitance value set as a function of a damping factor and a corresponding stray capacitance between terminals of the second switch, the function comprising a relationship between a polynomial of the damping factor and the corresponding stray capacitance.

18. A switching circuit for a voltage source converter, the switching circuit comprising:
a string of series-connected switches comprising a first and a second switch;
a string of capacitors;
a first conductor interconnecting, at the first switch, a first end of the string of series-connected switches with a first end of the string of capacitors;
a second conductor interconnecting, at the second switch, a second end of the string of series-connected switches with a second end of the string of capacitors;
a first string of components connected between the first end of the string of series-connected switches and the first end of the string of capacitors, wherein the first string of components comprises a first snubber resistor and a first snubber capacitor for the first switch, wherein the first snubber capacitor has a capacitance value set as a function of a damping factor and a corresponding stray capacitance between terminals of the first switch, the function comprising a relationship between a polynomial of the damping factor and the corresponding stray capacitance; and
a second string of components connected between the second end of the string of series-connected switches and the second end of the string of capacitors, wherein the second string of components comprises a second snubber resistor and a second snubber capacitor for the second switch, wherein the second snubber capacitor has a capacitance value set as a function of a damping factor and a corresponding tray capacitance between terminals of the second switch, the function comprising a relationship between a polynomial of the damping factor and the corresponding stray capacitance;
wherein the damping factor is set based on a quotient between a stray inductance of the first and second string of components and a loop stray inductance, the loop stray inductance based on the stray inductance of the loop formed between the string of switches and the string of capacitors using the first conductor and the stray inductance of the loop formed between the string of switches and the string of capacitors using the second conductor.

19. The switching circuit according to claim 18, wherein the damping factor is the damping factor corresponding to an absolute damping that is maximized at the quotient.

20. The switching circuit according to claim 19, wherein the absolute damping factor is obtained based on at least one pole in a polynomial of an impedance of the switching circuit.

* * * * *